UNITED STATES PATENT OFFICE.

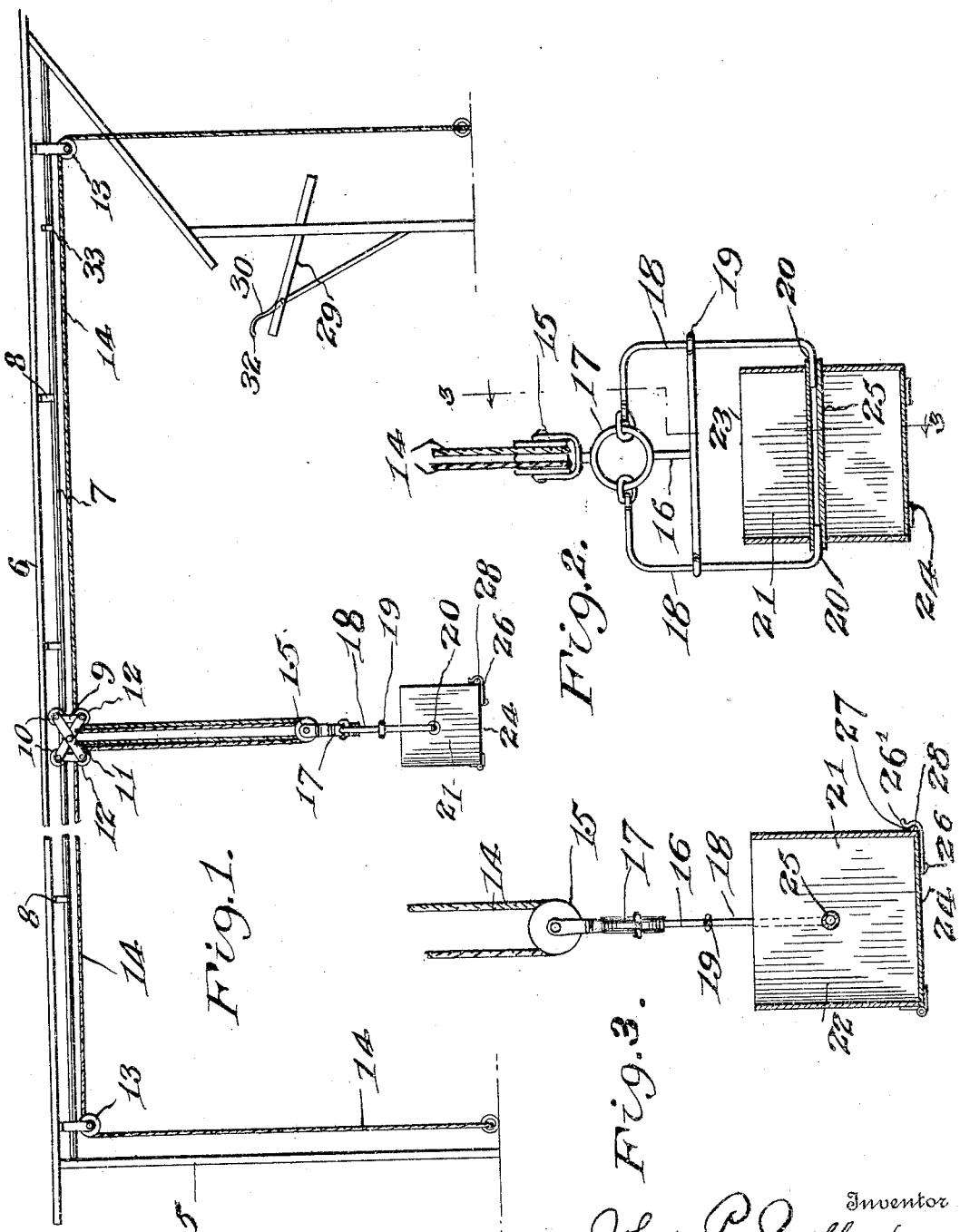

JOHN P. ZOLLER, OF CASCADE, IOWA.

HOISTING AND DUMPING MECHANISM.

959,096. Specification of Letters Patent. Patented May 24, 1910.

Application filed September 30, 1909. Serial No. 520,250.

*To all whom it may concern:*

Be it known that I, JOHN P. ZOLLER, a citizen of the United States, residing at Cascade, in the county of Dubuque and State of Iowa, have invented certain new and useful Improvements in Hoisting and Dumping Mechanism, of which the following is a specification, reference being had to the accompanying drawings.

This invention has relation to certain new and useful improvements in grapples for hoisting and dumping buckets, and more particularly to a novel device of this character which is adapted to be quickly attached and detached to or from the bucket.

Another object is to provide a bucket grapple of simple and novel construction, strong and durable in use and one which may be manufactured at a low cost.

With these and other objects in view, the invention consists of the novel construction, combination and arrangement of parts, hereinafter fully described and claimed, and illustrated in the accompanying drawings, in which:—

Figure 1 is a side elevation of a hoisting and dumping device illustrating the application of my improved grapple to a hoisting bucket; Fig. 2 is an enlarged vertical section through the bucket showing the manner of engaging the grapple therewith; and Fig. 3 is a section taken on the line 3—3 of Fig. 2.

Referring to the drawings 5 indicates the end members of a supporting frame, the upper ends of which are detachably connected to the ends of a longitudinal beam 6. To the beam 6 a track 7 is connected by means of the hanger bars 8. Upon the track 7 the carrier 9 is mounted. This carrier may be of any preferred construction, but as shown in the drawings comprises the track engaging wheels 10 which are carried upon the upper ends of a suitable frame 11, to the lower ends of which rotatable pulleys 12 are secured. Adjacent to the opposite ends of the track and depending therefrom a single pulley 13 is secured. Over the pulleys 12 and 13 the cables 14 extend and have one of their ends secured to the opposite side of the frame 11. The opposite ends of said cables extend to the ground within convenient reach of the operator.

My improved grapple illustrated more clearly in Fig. 2 of the drawings is adapted to carry a duplex pulley or sheave 15, around which the hoisting cables 14, pass. This pulley is mounted in a yoke formed upon the upper end of a rod 16. A ring 17, is also formed on the rod 16, and has connected thereto one end of each of the rods 18, which form the parallel side arms of the grapple. A rod or bar 19, is formed upon the lower end of the rod 16, and extends laterally therefrom upon each side of said rod. The ends of the rod 19, are secured to the side arms 18, of the grapple and provide a strong and efficient bracing connection therewith. The rods of which the grapple is constructed are preferably formed from heavy steel wire and are slightly resilient. The lower ends of the side arms 18, of the grapple are inwardly bent at right angles as shown at 20, and are adapted to be disposed through the opposite sides of the hoisting bucket 21, and yieldably held therein by the resiliency of the grapple arms. The hoisting bucket is adapted to oscillate upon the ends 20, of said rods and comprises the side members 22 and the hinged bottom member 24. The bucket is preferably provided with a tube 25, extending therethrough and fixed in the sides of the bucket, said tube receiving the inwardly extending extremities 20, of the grapple arms 18.

The rods 18 may be sprung outwardly for engagement in the ends of this tube, the resiliency of said rods securely holding the inturned ends 20 in the tube against any possibility of their accidental release. The bucket 21 is thus pivotally mounted in the ends of the frame. To the bottom 24 of the bucket at its forward edge the spring hooks 26 are secured. These hooks are arranged adjacent to the opposite sides of the bucket and extend upwardly and inwardly, their extremities being outwardly curved as shown at 26'. A groove or recess 27 is thus provided in the hook which is adapted to receive an outwardly projecting lug 28, formed upon a plate attached to the front of the bucket. The resiliency of these hooks is such that the hinged bottom 24 will be securely held in its closed position when the bucket is filled with grain.

Extending outwardly and upwardly from the bin, granary, or other place where the grain is to be deposited there is an inclined chute 29 in the outer end of which the tripping device is positioned. This device comprises a single length of heavy steel wire which is bent to form the outwardly and upwardly curved parallel side portions 30, the ends of said wire being laterally extended in opposite directions and secured through the sides of the chute. The outer ends of the side portions 30 are connected by the intermediate portion 32 of the wire which is adapted to engage with the hooks 26 to release the bottom of the bucket and empty the grain. In the operation of the device, the bucket 21 is filled with grain, and the grapple has its ends 20 inserted into the opposite ends of the tube 25 which extends through the opposite sides of the bucket. The cables 14 are now drawn over the pulleys 12 and 13, and the frame and bucket elevated to a position adjacent to the track 7. Continued pull upon the cables will move the carrier 9 and the grapple and bucket upon the track in either direction. A suitable stop 33 is adjustably carried by the track, and is arranged thereon at the proper point to engage with the grapple when the bucket has arrived at the point where it is engaged with the tripping device. At this period of the movement of the bucket, the intermediate connecting portion 32 of the trip will engage with the outwardly curved ends 26' of the hooks, and release the bottom of the bucket which will swing downwardly on its hinges and discharge the grain therefrom into the chute 29 from whence it will gravitate into the bin or granary. In this manner the grain may be quickly conveyed from place to place, greatly facilitating its removal and storage, and obviating the great amount of labor previously required in the performance of this work.

While the grain bucket is preferably constructed of sheet metal, it will be understood that it may also be constructed of wood. It will be obvious that a great many other modifications may be resorted to within the scope of the claims, without materially altering the essential features of the invention or sacrificing any of the advantages derived therefrom. It may be easily and quickly placed in operative position, is constructed of very few parts, and is not liable to get out of order and require expensive repairs. It is also highly durable and efficient in operation and may be manufactured at a minimum cost.

Having thus described the invention, what is claimed is:

1. A hoisting grapple comprising two lengths of resilient wire bent at right angles intermediate of their ends to form the sides of the grapple, the lower end of each of said wires being adapted for yieldable engagement in one side of a bucket, a bar connecting said wires, a ring carried by said bar, the upper ends of said side wires being connected thereto, and a sheave carried by said ring adapted to be traversed by the hoisting ropes, substantially as and for the purpose set forth.

2. A hoisting grapple comprising resilient wire side members having one of their ends inwardly bent and adapted for resilient engagement in the sides of a bucket, a bar connecting said side members intermediate of their ends, said bar having a central vertical extension with a ring formed upon its upper end, the upper ends of said side members being inwardly bent and loosely connected to said ring, and a sheave mounted in a bearing formed on the ring adapted to be traversed by the hoisting ropes substantially as and for the purpose set forth.

In testimony whereof I hereunto affix my signature in the presence of two witnesses.

JOHN P. ZOLLER.

Witnesses:
    NICHOLAS BOHLER,
    F. J. NEUWOEHNER.